United States Patent [19]

Shimizu et al.

[11] Patent Number: 4,651,840

[45] Date of Patent: Mar. 24, 1987

[54] MOTOR-DRIVEN POWER STEERING SYSTEM

[75] Inventors: Yasuo Shimizu; Toshitake Kawai, both of Tochigi, Japan

[73] Assignee: Honda Giken Kogyo Kabushiki Kaisha, Tokyo, Japan

[21] Appl. No.: 832,944

[22] Filed: Feb. 26, 1986

[30] Foreign Application Priority Data

Feb. 26, 1985 [JP] Japan ................................ 60-36800
Feb. 26, 1985 [JP] Japan ................................ 60-36801

[51] Int. Cl.$^4$ ............................................. B62D 5/04
[52] U.S. Cl. .................................... 180/79.1; 180/142
[58] Field of Search ....................... 180/79.1, 141, 142, 180/143

[56] References Cited

U.S. PATENT DOCUMENTS

| | | | |
|---|---|---|---|
| 4,437,532 | 3/1984 | Nakamura et al. | 180/143 |
| 4,522,278 | 6/1985 | Kitagawa et al. | 180/142 |
| 4,527,653 | 7/1985 | Agarwol et al. | 180/79.1 |
| 4,538,698 | 9/1985 | Hashimoto et al. | 180/142 |

*Primary Examiner*—John J. Love
*Assistant Examiner*—Donn McGiehan
*Attorney, Agent, or Firm*—Armstrong, Nikaido, Marmelstein & Kubovcik

[57] ABSTRACT

The assistive torque generated by a motor or the torque transmitted by a clutch when the speed of travel of a motor vehicle is increased beyond a prescribed value while a steering torque is being applied, is reduced with time from a predetermined value. The assistive torque generated by the motor or the torque transmitted by the clutch when the speed of the motor vehicle is reduced below the prescribed value while the steering torque is being applied, is increased with time up to the predetermined value. Therefore, when the speed of the motor vehicle changes from a high speed to a low speed, the motor-driven power steering system is smoothly stopped and enters a manual steering mode. When the speed of the motor vehicle changes from a low speed to a high speed, the motor-driven power steering system is smoothly started from the manual steering mode. The motor-driven power steering system is continuously operated when the speed of the motor vehicle fluctuates in the vicinity of the prescribed value. The motor-driven power steering system can therefore be stopped and operated smoothly and stably as the motor vehicle speed reaches the prescribed value, so that the steering feeling and stability can be improved.

2 Claims, 21 Drawing Figures

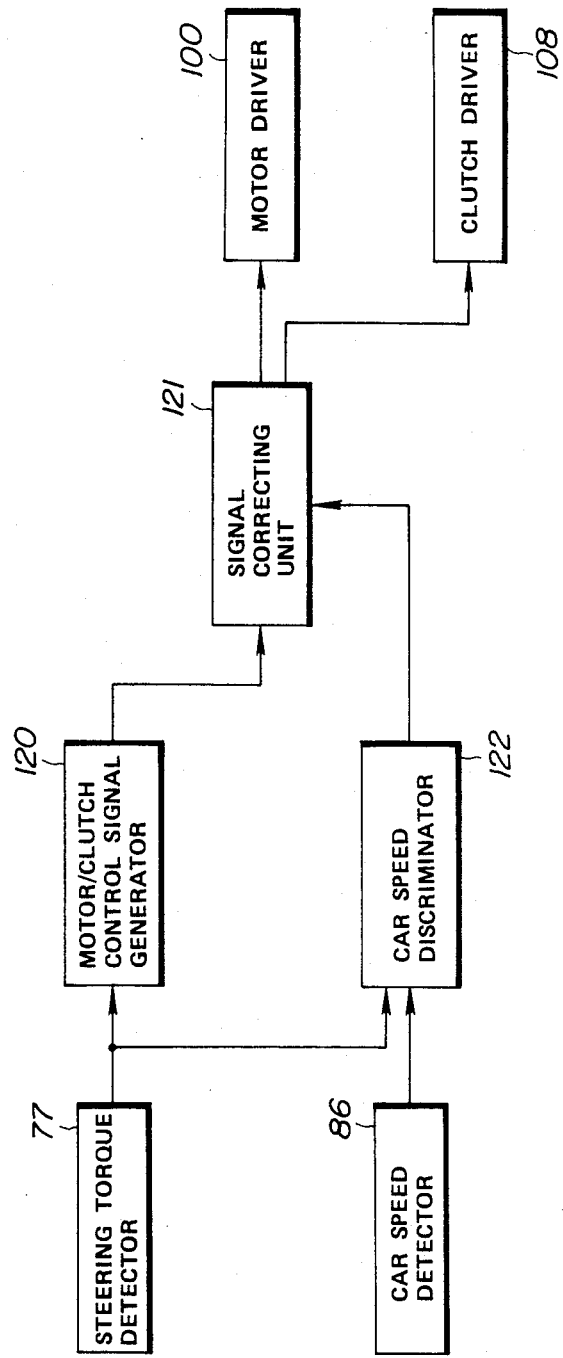

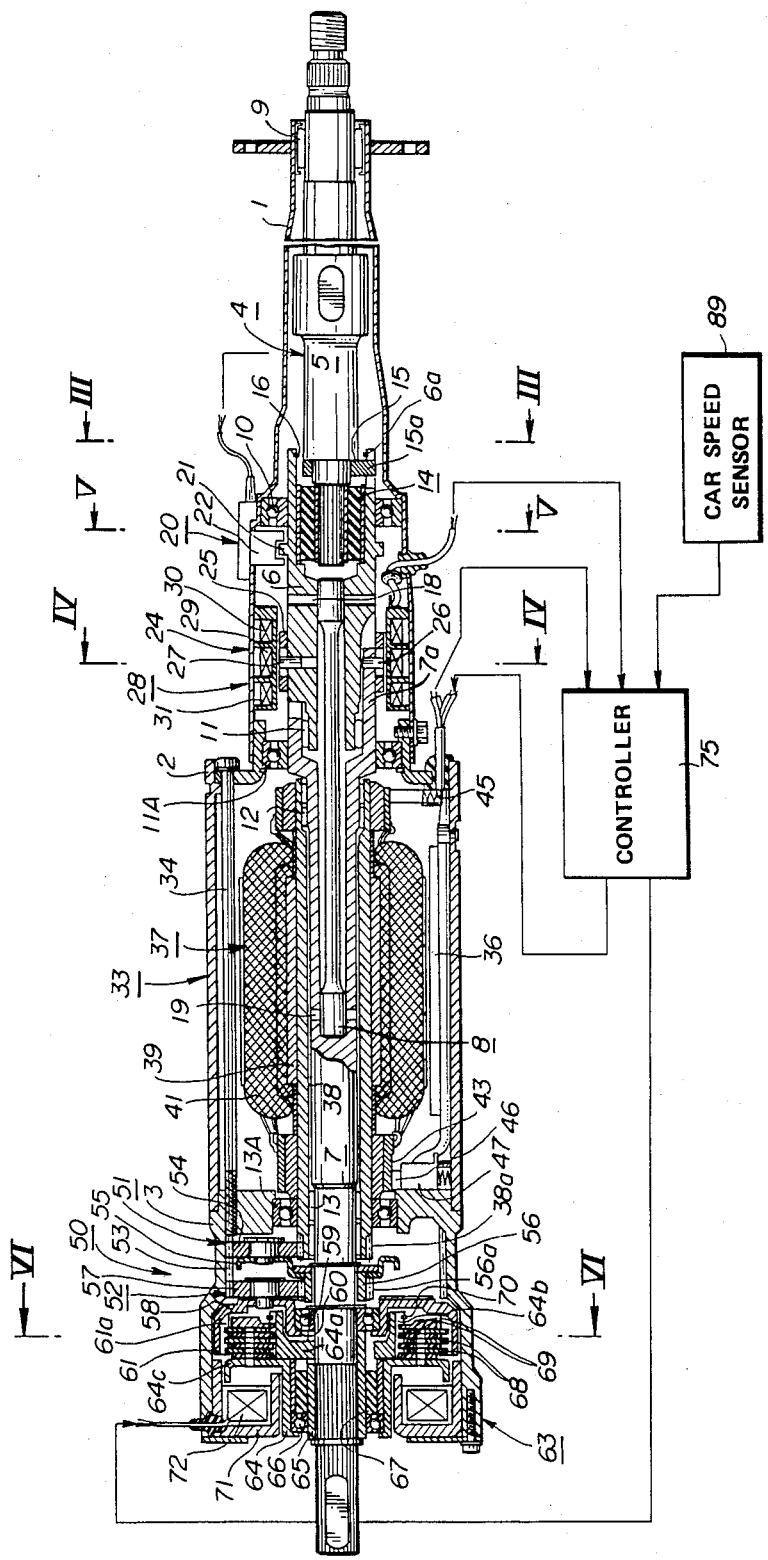

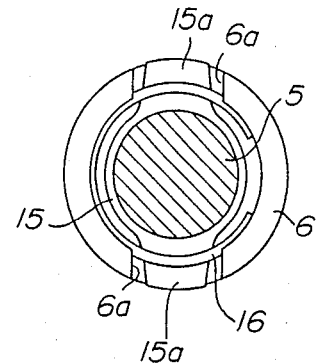
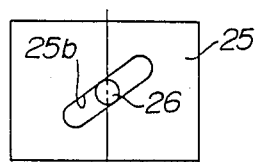
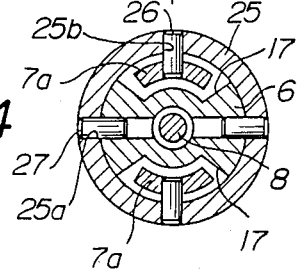
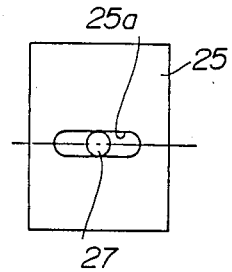
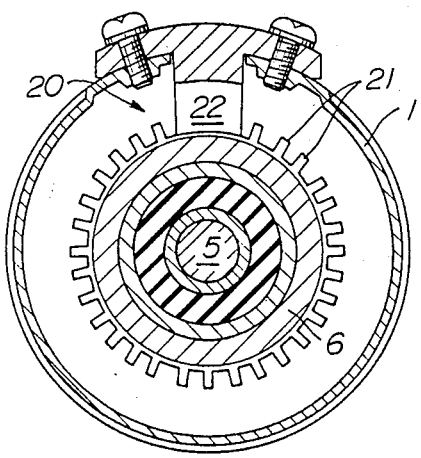
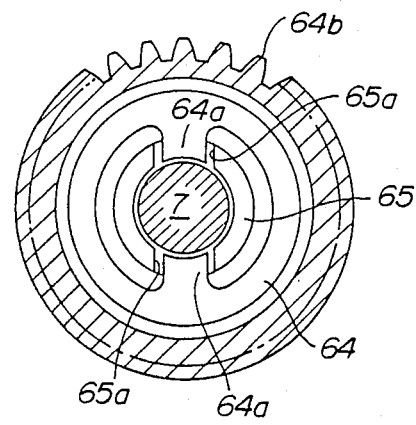

MOTOR-DRIVEN POWER STEERING SYSTEM

BACKGROUND OF THE INVENTION

The present invention relates to a motor-driven power steering system, and more particularly to a motordriven power steering system for use on a motor vehicle, including a power steering unit comprising an electric motor for generating an assistive torque to reduce the driver's effort to turn the steering wheel, the power steering unit being controllable in response to the speed of travel of the motor vehicle.

Power steering systems for motor vehicles such as automobiles include hydraulically operated or motor-driven power steering units. Generally, the steering torque required to turn the steering wheel is small when the motor vehicle runs at higher speeds, and is large when the motor vehicle travels at lower speeds. Therefore, it is desired that the power steering unit be operated only when the motor vehicle runs at lower speeds, requiring an assistive wheel turning torque, and the power steering unit be at rest when the motor vehicle runs at higher speeds.

Japanese Patent Publication No. 53-38849, published on Oct. 18, 1978, discloses one conventional moror-driven power steering system. The disclosed motor-driven power steering system includes a clutch for selectively connecting an assistive-torque generating motor to the shaft of a steering wheel. The clutch is controlled such that when there is no steering torque applied, i.e., when the motor vehicle runs straight or the steering wheel is turned across its neutral position, the clutch is connected at the time the speed of travel of the motor vehicle is reduced, and is disconnected at the time the speed of travel of the motor vehicle is increased. The steering torque is therefore prevented from abruptly varying while the steerable wheels of the motor vehicle are being steered.

The problems with the conventional motor-driven power steeing system are as follows: When the speed of travel of the motor vehicle is reduced and there is some steering torque applied, as when the motor vehicle is decelerated while turning along a curve, the clutch remains disconnected and hence a large manual force is required to turn the steering wheel when the motor vehicle runs at a low speed. Conversely, when the speed of travel of the motor vehicle is increased and there is some steering torque applied, the clutch remains connected and the steering force required is too small when the motor vehicle runs at a high speed. Furthermore, when the steering wheel is turned quickly across its neutral position, the steering torque is instantaneously eliminated. Therefore, the clutch is abruptly connected if the motor vehicle is decelerated, and disconnected if the motor vehicle is accelerated. As a result, the steering stability and the steering feeling they are felt by the driver are impaired.

SUMMARY OF THE INVENTION

It is an object of the present invention to provide a motor-driven power steering system designed to achieve improved steering stability and steering feeling.

Another object of the present invention is to provide a motor-driven power steering system including a motor for generating an assistive torque and a means for reducing the generated assistive torque with time when the speed of travel of the motor vehicle is increased beyond a preset level while a steering torque is being applied, and for increasing the generated assistive torque with time when the speed of travel of the motor vehicle is reduced beyond a preset level while a steering torque is being applied.

Still another object of the present invention is to provide a motor-driven power steering system including a clutch for transmitting an assistive torque from a motor to a steering wheel and a means for reducing the transmitted assistive torque with time when the speed of travel of the motor vehicle is increased beyond a preset level while a steering torque is being applied, and for increasing the transmitted assistive torque with time when the speed of travel of the motor vehicle is reduced beyond a preset level while a steering torque is being applied.

According to the present invention, there is provided a motor-driven power steering system for use on a motor vehicle, comprising steering torque detector means for detecting a steering torque applied to a steering mechanism and producing a torque signal representative of the detected steering torque, motor control signal generator means responsive to the torque signal from the steering torque detector means for producing a motor control signal, motor driver means responsive to the motor control signal from the motor control signal generator means for driving a motor to apply an assistive torque to the steering mechanism, speed detector means for detecting a speed of travel of the motor vehicle and producing a speed signal indicative of the detected speed, speed discriminator means responsive to the speed signal from the speed detector means for ascertaining whether the speed is increased or reduced beyond a prescribed value, and signal correcting means responsive to an output signal from the speed discriminator means for reducing the motor control signal with time from a predetermined value when the speed is increased beyond the prescribed value and for increasing the motor control signal with time up to the predetermined value when the speed is reduced below the prescribed value.

According to the present invention, there is also provided a motor-driven power steering system for use on a motor vehicle, comprising steering torque detector means for detecting a steering torque applied to a steering mechanism and producing a torque signal representative of the detected steering torque, a motor for applying an assistive torque to the steering mechanism dependent on the steering torque, clutch means for selectively connecting the motor to the steering mechanism, clutch control signal generator means responsive to the torque signal from the steering torque detector means for producing a clutch control signal to determine a torque to be transmitted by the clutch means, clutch driver means responsive to the clutch control signal from the clutch control signal generator means for driving the clutch means, speed detector means for detecting a speed of travel of the motor vehicle and producing a speed signal indicative of the detected speed, speed discriminator means responsive to the speed signal from the speed detector means for ascertaining whether the speed is increased or reduced beyond a prescribed value, and signal correcting means responsive to an output signal from the speed discriminator means for reducing the torque transmitted by the clutch means with time from a predetermined value when the speed is increased beyond the prescribed value and for increasing the torque transmitted by the clutch means with time up to the predetermined value when the speed is reduced below the prescribed value.

With the above arrangement, the assistive torque generated by the motor or the torque transmitted by the clutch means when the speed of the motor vehicle is increased beyond the prescribed value while the steering torque is being applied, is reduced with time from the predetermined value. The assistive torque generated by the motor or the torque transmitted by the clutch means when the speed of the motor vehicle is reduced below the prescribed value while the steering torque is being applied, is increased with time up to the predetermined value. Therefore, when the speed of the motor vehicle changes from a high speed to a low speed, the motor-driven power steering system is smoothly stopped and enters a manual steering mode. When the speed of the motor vehicle changes from a low speed to a high speed, the motor-driven power steering system is smoothly started from the manual steering mode. The motor-driven power steering system is continuously operated when the speed of the motor vehicle fluctuates in the vecinity of the prescribed value. The motor-driven power steering system can therefore be stopped and operated smoothly and stably as the motor vehicle speed reaches the prescribed value, so that the steering feeling and stability can be improved.

The above and further objects, details and advantages of the present invention will become apparent from the following detailed description of preferred embodiments thereof, when taken in conjunction with the accompanying drawings.

BRIEF DESCRIPTION OF THE DRAWINGS

FIG. 1 is a block diagram of a motor-driven power steering system according to an embodiment of the present invention;

FIG. 2 is a longitudinal cross-sectional view of a power steering unit of the motor-driven power steering system;

FIG. 3 is a cross-sectional view taken along line III—III of FIG. 2;

FIG. 4 is a cross-sectional view taken along line IV—IV of FIG. 2;

FIG. 4A is a plan view of the portion shown in FIG. 4;

FIG. 4B is a side elevational view of the portion shown in FIG. 4;

FIG. 5 is a cross-sectional view taken along line V—V of FIG. 2;

FIG. 6 is a cross-sectional view taken along line VI—VI of FIG. 2;

DETAILED DESCRIPTION OF THE PREFERRED EMBODIMENTS

Figure 7:
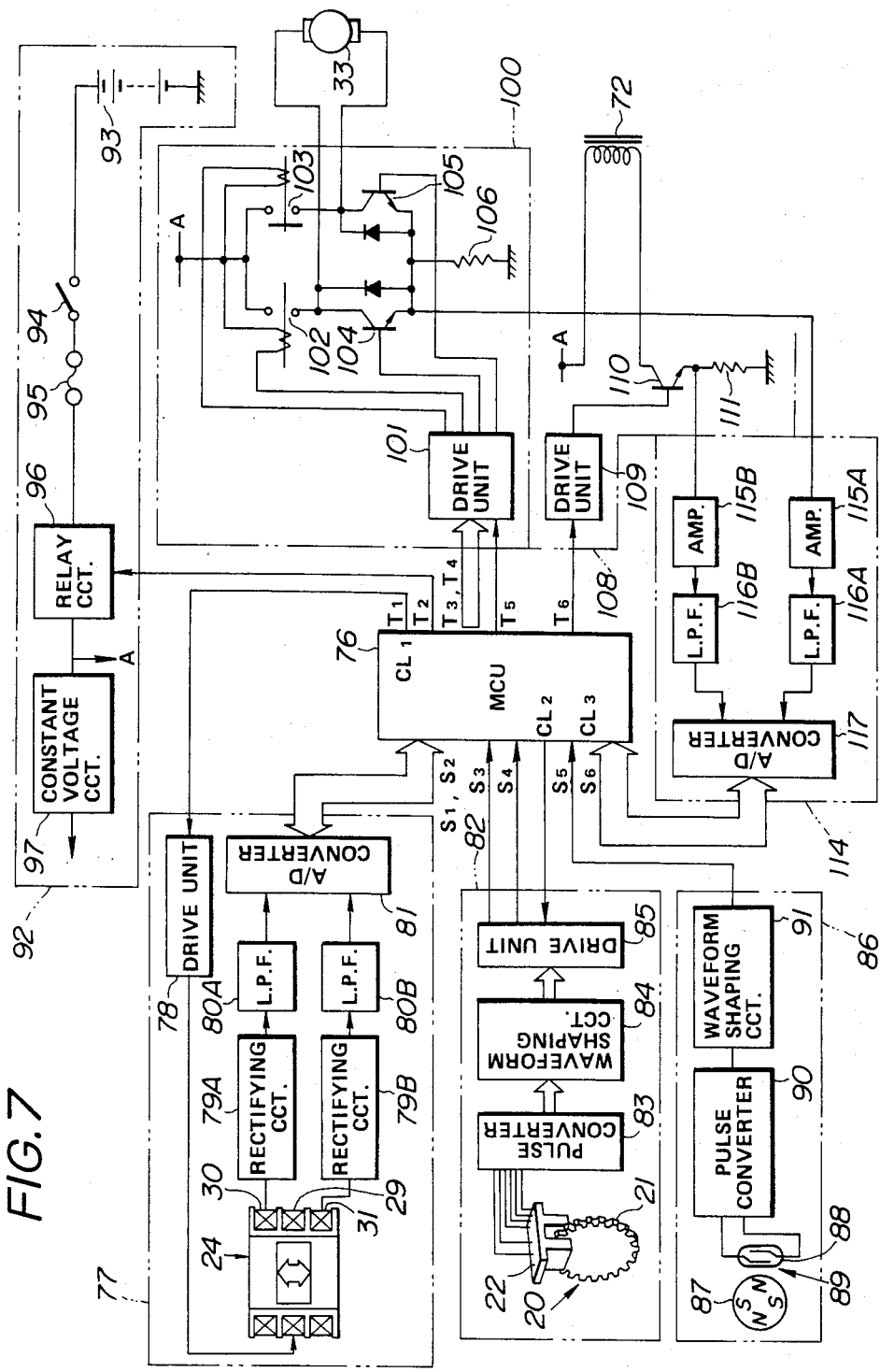
FIG. 7 is a block diagram of a controller in the motor-driven power steering system.

FIG. 1 shows a general arrangement of a motor-driven power steering system for use on a motor vehicle such as an automobile, according to the present invention. When an ignition key switch is turned on, a steering torque detector 77 and a car speed detector 86 generate respective detected output signals. As the steering wheel is turned, a motor/clutch control signal generator 120 determines an armature voltage for an assistive-torque generating motor or a torque to be transmitted by a clutch based on the detected torque signal from the steering torque detector 77, and applies the armature voltage or the torque as a motor or clutch control signal to a signal correcting unit 121. A car speed discriminator 122 responds to the detected signals from the steering torque detector 77 and the car speed detector 86 for ascertaining whether the speed of travel of the motor vehicle is higher or lower than a preset level. If the speed of the motor vehicle is higher than the preset level, then the car speed discriminator 122 produces a reduction signal and applies same to the signal correcting unit 121. Conversely, if the speed of the motor vehicle is lower than the preset level, then the car speed discriminator 122 produces an increase signal and applies same to the signal correcting unit 121. The signal correcting unit 121 is responsive to the reduction signal for progressively reducing the armature voltage or the clutch torque with time to zero, and also responsive to the increase signal for progressively increasing the armature voltage or the clutch torque with time to a predetermined level. The signal correcting unit 121 then applies the control signal thus corrected to a motor driver 100 or a clutch driver 108 for driving the motor or the clutch.

FIG. 2 illustrates a power steering unit in the motor-driven power steering system, the power steering unit being shown in cross section taken along longitudinal two mutually perpendicular planes. A steering column 1 is fixed to a tubular motor stator 2 coupled to a case 3. Coaxially aligned input and output shafts 4, 7 are rotatably disposed in the steering column 1, the motor stator 2, and the case 3. The input shaft 4 has an inner end loosely fitted in the inner end of the output shaft 7. The inner ends of the input and output shafts 4, 7 are interconnected by a torsion bar 8. The input shaft 4 is rotatably supported by bearings 9, 10, 11 in the steering column 1, and the output shaft 5 is rotatably supported by bearings 11A, 12, 13 in the motor stator 2. The power steering system also includes a steering rotation sensor 20 disposed around the input shaft 4, a steering torque sensor 24 disposed around the input and output shafts 4, 7 where they are interfitted, a motor 33 disposed around the output shaft 7, speed reducer 50 housed in the case 3 and disposed around the output shaft 7, an electromagnetic clutch 63 housed in the case 3 and disposed around the output shaft 7, and a controller 75 for controlling the motor 33 and the electromagnetic clutch 63 based on detected signals generated by the steering rotation sensor 20 and the steering torque sensor 24.

More specifically, the input shaft 4 comprises a first shaft portion 5 and a second tubular shaft portion 6. The first shaft portion 5 has an outer end (the righthand end in FIG. 2) to which a steering wheel (not shown) is connected, and an inner end disposed in and connected to the second shaft portion 6 through a rubber bushing 14 which serves to prevent vibration from being transmitted between the first and second shaft portions 5, 6. As illustrated in FIG. 3, an annular member 15 having a pair of radial projections 15a, 15a is fixed to the first shaft portion 5, the radial projections 15a, 15a being loosely inserted in respective grooves 6a, 6a defined in one end (the righthand end in FIG. 2) of the second shaft portion 6. Therefore, the first and second shaft portions 5, 6 are resiliently coupled to each other by the rubber bushing 14, and can be brought into engagement with each other through the annular member 15 after they have turned through a certain angle, so that loads greater than a certain torque will not be imposed on the rubber bushing 14. The radial projections 15a, 15a are retained in the respective grooves 6a, 6a by a retaining ring 16 to guard against removal.

As shown in FIGS. 4, 4A, and 4B, the other end (the lefthand end in FIG. 2) of the second shaft portion 6 has a pair of axial grooves 17, 17 defined in diametrically opposite relation. The output shaft 7 has a larger-diameter inner end portion including a pair of axially projecting tongues 7a, 7a inserted respectively in the grooves 17, 17 with clearances therebetween. The other end of the second shaft portion 6 has a smaller-diameter portion supported by the bearing 11 in the larger-diameter inner end portion of the output shaft 7. The torsion bar 8 extends axially through bores defined in the inner end portions of the second shaft portion 6 and the output shaft 7. The torsion bar 8 has an end (the righthand end in FIG. 2) secured by a pin 18 to the second shaft portion 6. The other end of the torsion bar 8 is secured by a pin 19 to the output shaft 7. The outer end (the lefthand end in FIG. 2) of the output shaft 7 is coupled to a shaft (not shown) connected to a load by splines on the output shaft 7. Therefore, the steering torque imparted by the steering wheel to the input shaft 4 can be transmitted to the output shaft 7 and hence the load through the torsion bar 8 as it is twisted. The rigidity of the rubber bushing 14 as selected to be higher than that of the torsion bar 8.

As shown in FIG. 5, the steering rotation sensor 20 comprises a plurality of teeth 21 disposed on the outer circumferential surface of the second shaft portion 6 at equal angular intervals and projecting radially outwardly, and a photocoupler (photoelectric pickup or transducer) 22 attached to the steering column 1 in sandwiching relation to the teeth 21. The photocoupler 22 serves to detect light interrupted by the teeth 21 and converts the detected light into a pulsed electric signal.

The steering torque sensor 24 comprises a differential transformer composed of a tubular moving iron 25 disposed axially movably around the second shaft portion 6 and the output shaft 7 where they are interfitted, and a coil assembly 28 fixed to the inner circumferetial surface of the steering column 1. As illustrated in FIGS. 4, 4A, 4B, the tubular moving iron 25 has slots 25a, 25b in which there engage pins 26 mounted on the tongues 7a of the output shaft 7 and pins 27 mounted on the second shaft portion 6 in 90° spaced relation to the pins 26. The slots 25a extend along the axis of the tubular moving iron 25 and the slots 25b are inclined at a certain angle to the axis of the tubular moving iron 25. Therefore, when the second shaft portion 6 and the output shaft 7 are angularly displaced from each other in their circumferential direction, the tubular moving iron 25 is axially moved due to engagement of the pins 26 in the slots 25b and the pins 27 in the slots 25a. Thus, the tubular moving iron 25 is axially displaced dependent on the steering torque applied to the second shaft portion 6. The coil assembly 28 disposed around the tubular moving iron 25 comprises a primary coil 29 supplied with a pulse signal and a pair of secondary coils 30, 31 disposed coaxially on the opposite sides of the primary coil 29 for producing an output signal commensurate with the displacement of the tubular moving ion 25. Consequently, when there is an angular displacement between the second shaft portion 6 and the output shaft 7 as the torsion bar 8 is twisted, the axial displacement of the tubular moving iron 25 is converted into a corresponding electric signal.

The motor 33 includes the tubular motor stator 2 which is secured to the steering column 1 and the case 3 by bolts 34. The motor 33 also includes at least a pair of magnets 36 fixed to the inner surface of the stator 2, and a rotor 37 rotatably disposed around the output shaft 7. The rotor 37 has a tubular shaft 38 rotatably supported on the output shaft 7 by the bearings 12, 13 and rotatably supported on the stator 2 and the case 3 by the bearing 11A and a bearing 13A. Around the tubular shaft 38, there are disposed an iron core 39 having skewed grooves and a multiple winding 41 which is spaced a small air gap from the magnets 36. The tubular shaft 43 also supports a commutator 43 connected to the multiple winding 41. Brushes 36 slidably pressed against the commutator 43 are supported by brush holders 46 secured to the case 3 and connected to leads which extend through a non-magnetic pipe out of the stator 2. The motor 33 composed of the multiple winding 41, the commutator 43, and the brushes 46 serves to generate an assistive torque for assisting the driver in turning the steering wheel.

The speed reducer 50 comprises two front and rear planetary gear mechanisms 51, 52 disposed around the output shaft 7. The front planetary gear mechanism 51 comprises a common internal gear 53 disposed on the inner circumferential surface of the case 3, a sun gear 38a on the outer circumferential surface of an end (the lefthand end) of the tubular shaft 38, three planet gears 54 meshing with the common internal gear 53 and the sub gear 38a, and a first carrier 55 on which the planet gears 54 are rotatably supported. The rear planetary gear mechanism 52 comprises the common internal gear 53, a sun gear 56a on the outer circumferetial surface of a tubular body 56 disposed around the output shaft 7 and coupled fixedly to the first carrier 55, three planet gears 57 meshing with the common internal gear 53 and the sun gear 56a, and a second carrier 58 on wihch the planet gears 57 are rotatably supported. A tubular body 60 rotatably supported on the output shaft 7 by a bearing 59 is integrally coupled to the inner edge of the second carrier 58. Another tubular body 61 is integrally coupled to the outer edge of the second carrier 58 and extends along the inner circumferetial surface of the case 3. The tubular body 61 has inner teeth 61a disposed on the inner circumferential surface thereof and spaced circumferentially. Therefore, when the rotor 37 of the motor 33 rotates, its rotation is transmitted, as reduced in speed, via the tubular shaft 38, the planet gears 54, the first carrier 55, the planet gears 57, and the second carrier 58 to the tubular body 61.

The electromagnetic clutch 63 includes a tubular rotor 64 rotatably supported by a bearing 66 on an annular body 65 splined to the the output shaft 7, the rotor 64 being secured to the output shaft 7 through an annular resilient member 67 serving to absorb torsional vibration. The tubular rotor 64 has an axial extension extending to the tubular body 60 of the second carrier 58 and having a pair of projections 64a extending radially toward the outer circumferetial surface of the output shaft 7. As shown in FIG. 6, the projections 64a are loosely inserted in respectively grooves 64a defined in the annular body 64, with gaps present circumferentially between the projections 64a and the edges of the grooves 65a. Thus, the projections 64a are held in engagement with the annular body 65 in the circumferetial direction. The rotor 64 and the output shaft 7 are therefore resiliently coupled to each other as long as the projections 64a remain in the grooves 65a, i.e., until the projections 64a engage the annular body 65. The axial extension of the rotor 64 has outer teeth 64b on its outer circumferential surface and a disc-shaped support plate 64c extending radially outwardly and positioned remotely from the second carrier 58. Between the support plate 64c and the second carrier 58, there are alternately positioned disc plates 68 having grooves defined in their outer circumferential edges and meshing with the inner teeth 61a of the tubular body 61, and disc plates 69 having grooves defined in their inner circumferential edges and meshing with the outer teeth 64b of the rotor 64, thus providing a multiple-disc clutch mechanism. The plates 69 are retained in position by a stopper 70.

A frame 71 having a channel-shaped cross section is securedc to the case 3. An annular excitation coil 72 is housed in the frame 71 and connected to the controller 75 through a lead. When the coil 72 is energized, the plates 68, 69 are attracted by electromagnetic forces toward the coil 72. The torque transmitted from the motor 33 through the speed reducer 50 can therefore be transmitted via the multiple-disc clutch mechanism and the projections 64a of the rotor 64 to the output shaft 64.

The controller 75 will now be described with reference to FIG. 7.

The controller 75 contains the motor/clutch control signal generator 120, the signal correcting unit 121, the car speed discriminator 122, the motor driver 100, the clutch driver 108, and part of the steering torque detector 77 and the car speed detector 86 (FIG. 1). The controller 75 includes a microcomputer 76 (FIG. 7) which implements the motor/clutch control signal generator 120, the signal correcting unit 121, and the car speed discriminator 122. The microcomputer 76 is supplied with detected signals S1 through S6 from the steering torque detector 77, a steering rotation detector 82, the car speed detector 86, and a malfunction detector 114.

The steering torque detector 77 comprises the steering torque sensor 24, a drive unit 78 for frequency-dividing and applying clock pulses T1 from the microcomputer 76 to the primary coil 29 of the steering torque sensor 24, a pair of rectifying circuits 79A, 79B for rectifying electric signals generated by the respective secondary coils 30, 31 in response to axial displacement of the moving iron 25, a pair of low-pass filters 80A, 80B for removing high-frequency components from the rectified electric signals, and an A/D converter 81 for converting the analog electric signals from the low-pass filters 80A, 80B to digital signals and applying these digital signals as detected steering torque signals S1, S2 to the microcomputer 76.

Figure 16:
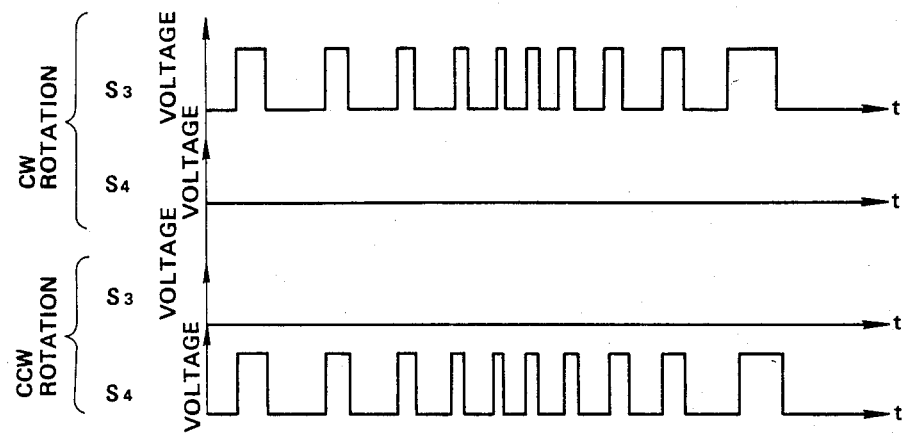
FIG. 16 is a diagram illustrating pulse signals indicative of steering speeds.

The steering rotation detector 82 comprises the steering rotation sensor 20, a pulse converter 83 for supplying electric currents to two light-emitting elements in the photocoupler 22 which are angularly spaced about 90° with respect to the teeth 21 on the second shaft portion 6 and for converting electric signals generated by light detectors confronting the light-emitting elements into pulse signals, a waveform shaping unit 84 for shaping the waveform of the pulse signals from the pulse converter 83, and a drive unit 85 for generating pulsed steering speed signals S3, S4 based on the pulse signals from the waveform shaping circuit 84 and clock pulses from the microcomputer 76. These steering speed signals S3, S4 have frequencies proportional to the speeds of rotation of the steering wheel. More specifically, when the steering wheel is turned clockwise as shown in FIG. 16, the pulse signal S3 is generated which has its frequency proportional to the speed of rotation of the steering wheel, and the pulse signal S4 is of a zero voltage. When the steering wheel is turned counterclockwise, the pulse signal S4 is generated which has its frequency proportional to the speed of rotation of the steering wheel, and the pulse signal S3 is of a zero voltage.

The car speed detector 86 comprises a car speed sensor 89 composed of a magnet 87 rotatable with a speedometer cable (not shown) and a reed switch 88 that can be turned on and off in response to rotation of the magnet 87, a pulse converter 90 for supplying an electric current to the reed switch 88 and generating a pulse signal in response to turning on and off of the reed switch 88, and a waveform shaping circuit 91 for shaping the waveform of the output pulse signal from the pulse converter 90 and issuing the shaped pulse signal as an output signal S5 with its frequency proportional to the speed of travel of the motor vehicle.

The microcomputer 76 comprises an I/O port, memories, and an arithmetic control unit. The microcomputer 76 and other circuits are energized by a power supply circuit 92 comprising a relay circuit 96 connected to the positive terminal of a vehicle-carried battery 93 through an ignition key switch 94 and a fuse 95, and a constant-voltage circuit 97 connected to the output terminal of the relay circuit 96. The motor driver 100 and the clutch driver 108 are supplied witn an electric current from an A terminal connected to the output terminal of the relay circuit 96. The constant-voltage circuit 97 has a B terminal from which an electric current is supplied to the microcomputer 76 and other control units. Therefore, when the key switch 94 is closed, the microcomputer 76 processes the detected signals S1 through S6 according to a program written in the memory thereof, and applies control signals T3, T4, T5 to the motor driver 100 for controlling the motor 33 and a current control signal T6 to the clutch driver 108 for controlling the electromagnetic clutch.

The motor driver 100 comprises a bridge circuit including a drive unit 101, relays 102, 103, and transistors 104, 105. The junction between the relays 102, 103 is connected to the A terminal of the power supply circuit 92. The transistors 104, 105 have emitters connected commonly to ground through a resistor 106. The excitation coils of the relays 102, 103 and the bases of the transistors 104, 105 are connected to the output terminals of the driver unit 101. The armature winding 41 of the motor 33 is connected between the collectors of the transistors 104, 105 which are coupled to the output terminals of the bridge circuit.

In response to the control signal T3 or T4 for the direction of rotation of the motor from the microcomputer 76, the drive unit 101 turns on the relay 102 to make the transistor 105 energizable or turns on the relay 103 to make the transistor 104 energizable. The drive unit 101 converts the motor control signal T5 into an analog signal and drives the energizable transistor in a PWM (pulse-width modulation) mode so that the armature voltage VA of the motor 33 will be equalized to the control signal T5. Therefore, the direction of rotation and the armature voltage VA of the motor 33 are controlled according to the control signals T3, T4, T5 by the relay 102 and the transistor 105 driven in the PWM mode or the relay 103 and the transistor 104 driven in the PWM in the motor driver 100.

The clutch driver 108 comprises a drive unit 109 and a transistror 110 having its collector connected through the excitation coil 72 of the electromagnetic clutch 63 to the A terminal of the power supply circuit 92. The emitter of the transistor 110 is connected via a resistor 111 to common ground, and the base thereof to the output terminal of the drive unit 109. The drive unit 109 serves to convert the control signal T6 into an analog signal and apply the analog signal to the transistor 110 so that the converted signal will be equalized to the voltage across the coil 72. Assuming that the voltage across the coil 72 is expressed by Vc, the resistance thereof by Rc, and the current flowing therethrough by Ic, $Vc = Rc \times Ic$. Since Rc is constant, the current Ic can be controlled by the voltage Vc. Thus, the transistor 110 in the clutch driver 108 is controlled by the drive unit 109 based on the current control signal T6 from the microcomputer 76, for thereby controlling the torque coupling force of the electromagnetic clutch 63.

The malfunction detector 114 serves to detect malfunctioning of the motor 33 and the electromagnetic clutch 63. The malfunction detector 114 includes an amplifier 115A for amplifying the voltage across the resistor 106, an amplifier 115B for amplifying the voltage across the resistor 111, a pair of low-pass filters 116A, 116B for removing high-frequency components from the output signals of the amplifiers 115A, 115B, and an A/D converter 117 for converting the voltages from the low-pass filters 116A, 116B into digital signals S6 and applying the digital signals S6 to the microcomputer 76. The malfunction detector 114 thus detects malfunctions of the motor 33 and the clutch 63 through the voltages across the respective resistors 106, 111. If the motor 33 or the clutch 63 fails or malfunctions, the microcomputer 76 applies a relay control signal T2 to the relay circuit 96 in the power supply circuit 92 to cut off the power supply from the power supply circuit 92.

Figure 8A:
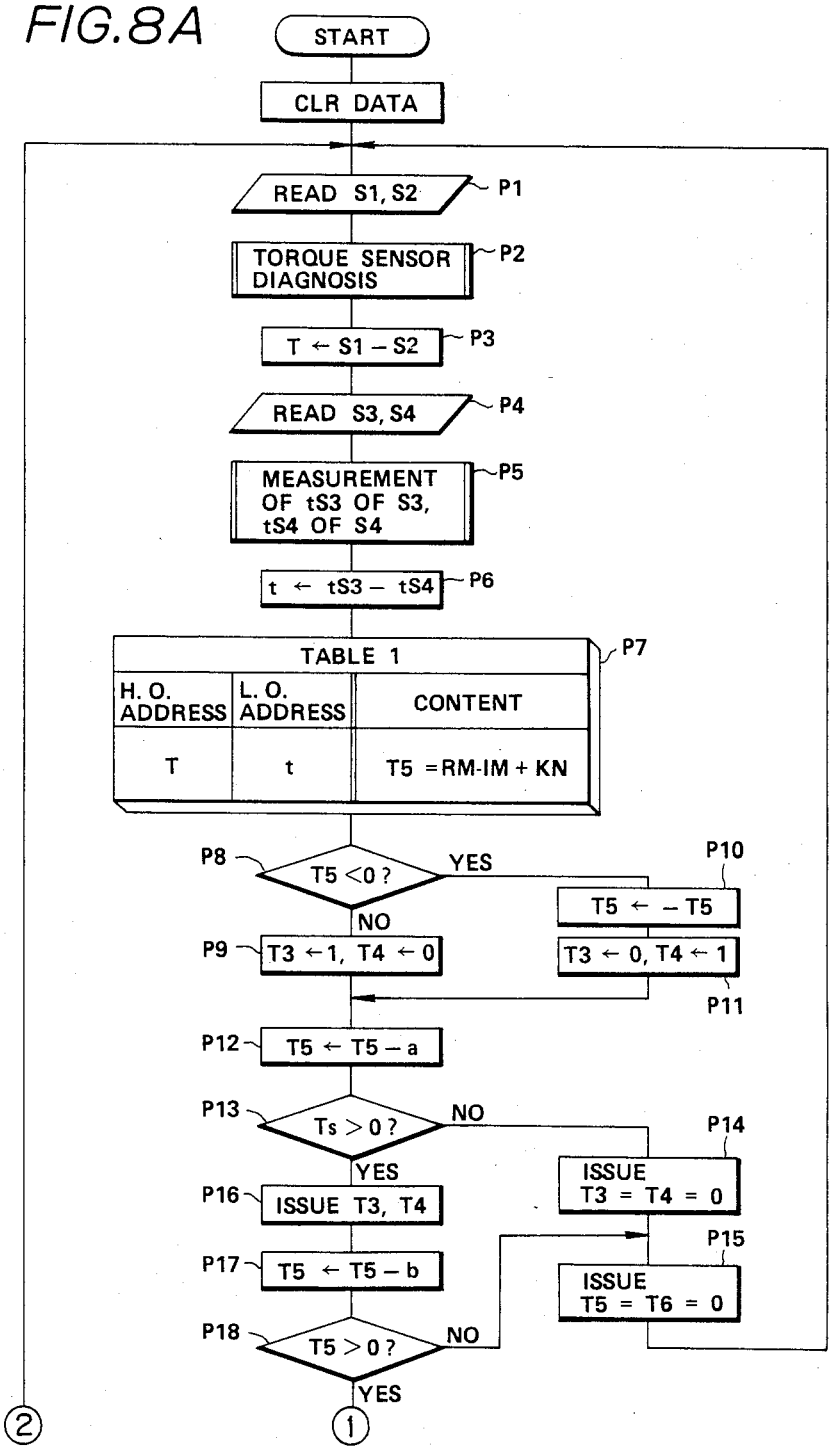
FIGS. 8A and 8B are a flowchart of a sequence of processing steps executed by the controller.
Figure 8B:
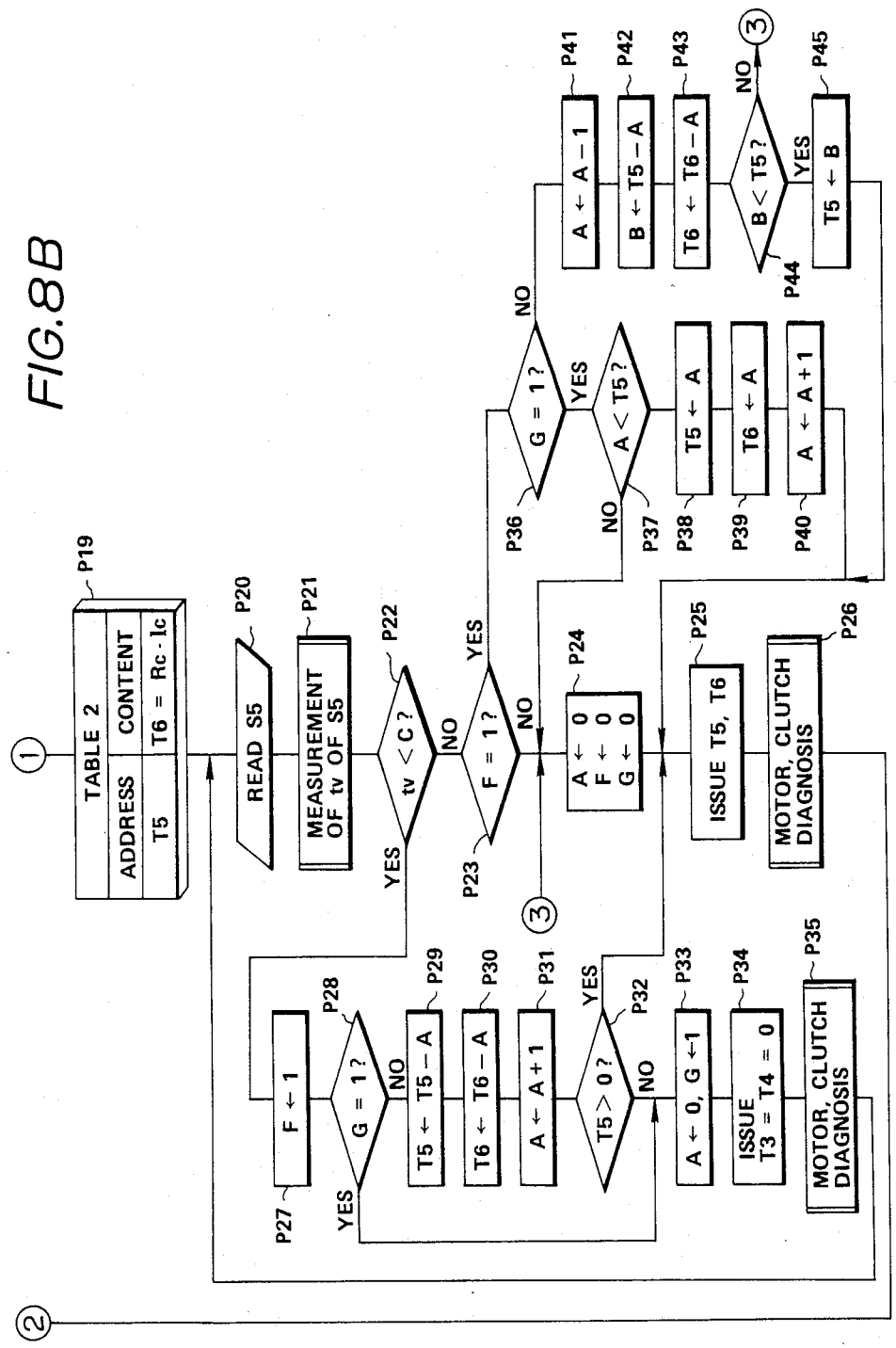

FIGS. 8A and 8B are a flowchart of successive steps executed by the microcomputer 76 for controlling the motor 33 dependent on the speed of travel of the motor vehicle.

When the ignition key switch 94 is closed, the microcomputer 76 and the other circuits are energized to start the control sequence. All data items in the registers and RAM (random-access memory) in the microcomputer 76 are cleared to zero. The detected steering torque signals S1, S2 are successively read in a step P1.

Figure 17:
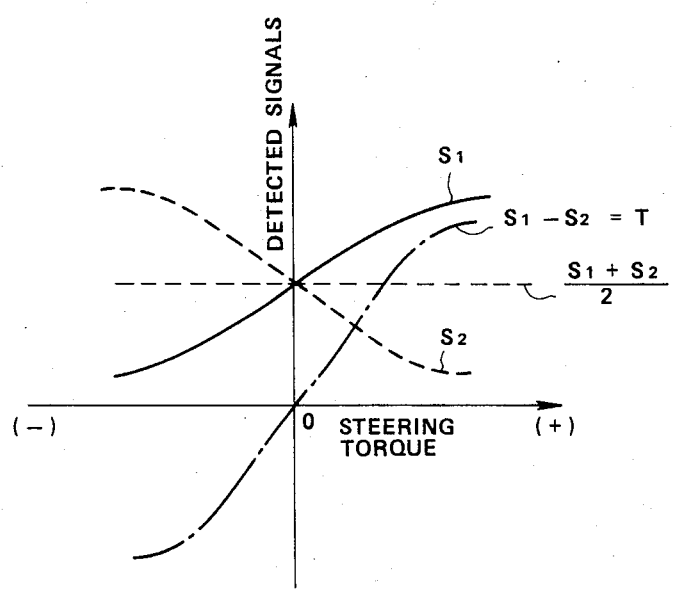
FIG. 17 is a graph showing the relationship between a steering torque and various detected signals.

A next step P2 ascertains whether the read signals are normal or not. If the read signals are not normal, then the microcomputer 76 issues the control signal T2 to turn off the relay circuit 96, stopping the operation of the microcomputer 76 and the other circuits. Since the steering torque sensor 24 is in the form of a differential transformer, the steering torque Ts and the steering torque signals S1, S2 are correlated as shown in FIG. 17, and the sum of the steering signals S1, S2 is constant as well known. The microcomputer 76 determines whether the value (S1+S2)/2 is in a predetermined range. If not in the predetermined range, the microcomputer 76 regards the steering torque sensor 24 as malfunctioning. If the read steering torque signals S1, S2 are normal, then the processing goes to a step P3 in which the difference S1−S2 between the steering torque signals is computed and stored as a steering torque T (=Ts).

Then, the microcomputer 76 reads the detected signals S3, S4 from the steering rotation detector 82 in a step P4. The periods ts3, ts4 of the signals S3, S4 are measured in a step P5, which is followed by a step P6 that computes the difference t between the periods ts3, ts4 to determine the direction of rotation of the steering wheel. If the steering wheel is turned clockwise, then t−ts3 (ts4=0), and if the steering wheel is turned counterclockwise, the t=ts4 (ts3=0).

Figure 9:
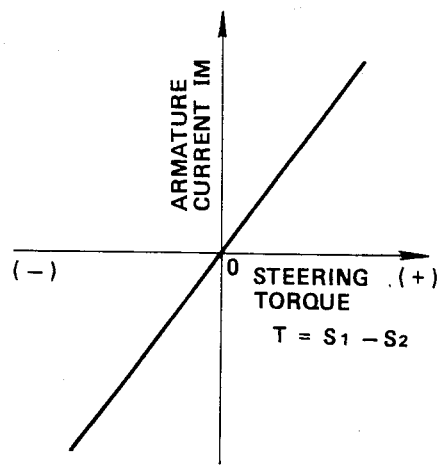
FIG. 9 is a graph showing the relationship between a torque signal and an armature current.
Figure 10:
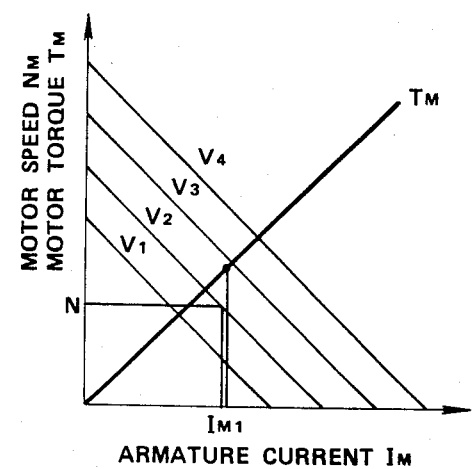
FIG. 10 is a graph showing the relationship between the armature current, and a motor speed and a motor torque.
Figure 11:
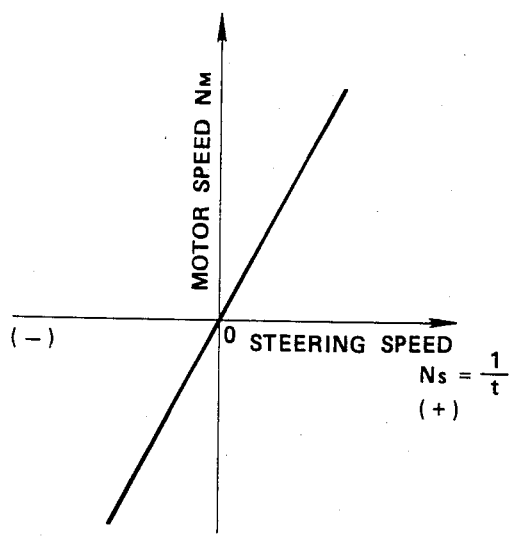
FIG. 11 is a graph showing the relationship between the motor speed and a steering speed.

In a step P7, a table 1 storing armature voltages VA is established in a microcomputer memory in which the steering torque T is used as a high-order address and the period t is used as a low-order address. The armature voltage VA is generally expressed by $VA = R - M \cdot IM + KN$ where RM is the resistance of the multiple winding, K an induced voltage constant, N the rotational speed of the motor, and IM the armature current, provided that the inductance is sufficiently small. The armature voltage VA is shown in FIG. 10. In the motor-driven power steering system, it is preferable that the armature current IM be proportional to the steering torque T, and the motor speed NM be proportional to the steering speed Ns. Where the steering torque T is proportional to the armature current IM as shown in FIG. 9 and the steering speed Ns is proportional to the motor speed NM as shown in FIG. 11, the armature voltage VA is given by:

$$VA = RM \cdot k1 \cdot T + k \cdot k2(1/t)$$

where k1, k2 are proportionality constants. With the values computed according to the above equation being stored in the table 1, an armature voltage VA can be determined by an address designated by a steering torque T and a period t corresponding to a steering speed Ns. The armature voltage VA is represented by the digital signal T5. A step P8 ascertains whether the digital signal T5 is positive or negative. If positive, then a step P9 processes the control signals T3, T4 so that T3=1 and T4=0 (clockwise rotation) and stores these control signals. If negative, then a step P10 makes the signal T5 positive, and a step P11 processes the control signals T3, T4 so that T3=0 and T4=1 (counterclockwise rotation) and stores these control signals.

The processing then goes to a step P12 in which a predetermined value a is subtracted from the control signal T5 to provide a first dead zone, and the result is stored as the control signal T5. A next step P13 ascertains whether the control signal T5 is positive or negative. If negative or zero, the processing jumps to a step P14 in which the control signals T3, T4 are equalized to T3=T4=0 and applied to de-energize the relays 102, 103 and the transistors 104, 105. Then, the control signals T5, T6 are stopped in a step P15 to de-energize the motor 33 and the electromagnetic clutch 63, and thereafter the processing goes back to the step P1. The steering wheel is now in the manual control mode. If the control signal T5 is positive, then the processing proceeds to a step P16 in which the control signals T3, T4 are issued. If T3=1, T4=0, then the relay 102 is energized to render the transistor 105 controllable. If T3=0, T4=1, then the relay 103 is energized to render the transistor 104 controllable.

A step P17 subtract a predetermined value b from the control signal T5 to provide a second dead zone, and uses the result as the control signal T5. A next step P18 ascertains whether the control signal T5 is positive or negative. If negative or zero, the processing jumps to the step P15 to make the control signals T5, T6 zero, de-energizing the motor 33 and the clutch 63. The processing then returns to the step P1. If the control signal T5 is positive, the processing goes to a step P19 in which a table 2 storing the product T6 of the clutch current Ic and the resistance Rc is established in a microcomputer memory with the motor control signal T5 used as an address. Thus, the values of RM Ic are computed in order to pass a current Ic proportional to the control signal T5. The clutch coupling force is therefore commensurate with the steering torque and the steering speed. The control signals T3, T4 for the directions of rotation of the motor are determined, and the control signals T5, T6 are determined in the manner described above (these signals will be referred to as "determined values"), and are ready to be issued. The control signal T5 includes the first and second dead zones for the following reason: The relays are subject to a large delay in operation as compared with the transistors. If the relays were energized at the same time that the control signal T5 is applied, the control signal T5 might be applied as a step-like signal. Therefore, the steering torque would abruptly be reduced to impair the steering feeling. The first and second dead zones are effective in preventing such an abrupt reduction in the steering torque.

Control of the motor 33 and the clutch 63 dependent on the speed of travel of the motor vehicle will be described below. The detected signal S5 from the car speed detector 86 is read in a step P20. Then, a step P21 measures the period tv of the signal S5. Since the car speed signal S5 has a frequency proportional to the car speed, the period tv is also related to the car speed. A next step P22 ascertains whether the period tv is smaller than a predetermined value C. When the car speed is higher than a prescribed value, the period tv is smaller than the predetermined value C. Conversely, when the car speed is lower than the prescribed value, the period tv is larger thn the predetermined value C. If the car speed is lower than the prescribed value, therefore, the period tv is larger than the predetermined value C, and the processing goes to a step P23. The microcomputer 76 contains signals A, F, G representative of the preceding control condition. When F=G=0, the power steering system is in a low-speed stable region in which it is controlled by the determined values T5, T6. When F=G=1, the power steering system is in a high-speed stable region in which it is inoperative with the motor control signals T3, T4, T5 and the clutch control signal T6 are zero. When F=1 and G=0, the power steering system is in a low- or high-speed unstable region in which the car speed is in excess of the prescribed value and the control signals T5, T6 are being reduced with time, but not yet have reached zero, or in which the car speed is lower than the prescribed value and the control signals T5, T6 are being increased with time, but not yet have reached the determined values thereof. The signal A is of a corrected value. The step P23 ascertains whether the preceding control mode is in the high-speed region. Since the initial data items are all set to zero at the start of the control sequence, F=0. Therefore, the processing goes to a step P24 in which A, F, and G are set to zero, indicating the low-speed stable region. Thereafter, a step P25 issues the determined control signals T5, T6 to actuate the motor-driven power steering system. A step P26 compares the detected signal S6 from the malfunction detector 114 with the control signals T5, T6. If the detected signal S6 is not in a prescribed range, then the microcomputer 76 applies the control signal T2 to de-energize the relay circuit 96, stopping the entire control operation to bring the steering system back to the manual steering mode. If the detected signal S6 falls in the prescribed range, then the processing returns to the step P1 for repeating the control sequence.

If the car speed is in excess of the prescribed value and hence the period tv of the detected signal S6 is smaller than the predetermined value C in the step P22, then the processing goes to a step P27 in which the signal F is set to 1 indicating that the car speed has exceeded the prescribed value. Thereafter, the processing goes to a step P28 which ascertains whether the preceding control mode is in the high-speed stable region or not. Since the preceding control mode is in the low-speed stable region, G=0. Therefore, the processing goes to a step P29 which subtracts the corrected value A from the control signal T5. Inasmuch as A=0 at this time, the signal T5 remains the same in the step P29, and the signal T6 also remains the same in a step P30. A next step P31 computes $A=A+1$ to store the data indicating that the processing has gone through the steps P29, P30 once. Thereafter, the processing proceeds to a step P32 which ascertains whether the control signal T5 is positive or not. If positive, the processing jumps to the step P25 since the control signals T5, T6 are required to be reduced. After the control signals T5, T6 have been issued, the processing goes through the diagnosis step P26 back to the step P1. When the processing reaches the step P29 again, the control signal T5 is processed according to $T5=T5-1$ in the step P29, and the control signal T6 is processed according to $T6=T6-1$, so that each of the control signals T5, T6 is reduced by 1. The control signals T5, T6 are therefore reduced with time each time the processing goes through the steps P29, P30, P31. When the control signal T5 reaches zero, the processing goes from the step P32 to a step P33 in which the reduced value A is set to zero and the signal G is set to 1 indicating the high-speed stable region. Then, a step P34 issues T3=T4=T5=T6=0 to inactivate the motor-driven power steering system, thus bringing the steering wheel back to the manual steering mode. The processing goes to a step P35 for motor and clutch diagnosis. If the motor and the clutch are normal, then the processing jumps to the step P20. As long as the power steering system is in the high-speed stable region, the processing goes from the step P22 to the loop of the steps P27, P28, P33, P34, P35, P20, p21 and repeats this loop, so that the steering system operates in the manual steering mode at all times.

If the car speed falls down to the prescribed value from the high-speed stable region, the processing goes from the step P22 to the step P23. Since F=1 in the step P23, the processing jumps to a step P36 which ascertains whether the preceding control mode is in the high-speed stable region. Because the preceding control mode is in the high-speed stable region, G=1 in the step P36, and hence the processing goes to a step P37 to ascertain whether the increased value A of the control signals T5, T6 has reached the determined value. Inasmuch as the proceding control mode is in the high-speed stable region, the corrected value A has been set to zero in the step P33. Therefore, A is smaller than T5 in the step P37, and the processing goes to a step P38 in which T5 is set to zero. Thereafter, T6 is set to zero in a step P39. The increased value A is incremented by 1 in a step P40, from which the processing jumps to the step P25 in which the control signals T5, T6 are issued. Then, the processing goes through the diagnosis step P26 back to the step P1. When the processing reaches the steps P38, P39 again, the control signals T5, T6 are set to 1 in these steps, so that the control signals T5, T6 are 1 larger than the previous values thereof. Each time the processing passes through the steps P38, P39, P40, the control signals T5, T6 are increased until they reach the normal control values, i.e., determined values. When the control signals T5 reaches the normal control value, i.e., the determined value, A=T5 in the step P37, and the processing jumps to the step P24 in which the control mode enters the low-speed stable region. The motor-driven power steering system is now operated under the control of the determined values of T5, T6.

Figure 13:
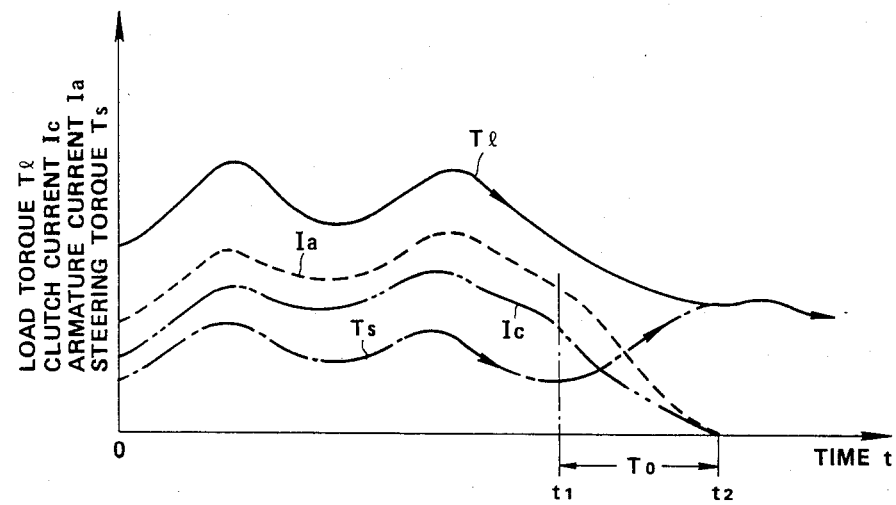
FIGS. 13 and 14 are graphs showing the manner in which the armature current varies with time as the speed of travel of the motor vehicle is increased and reduced.
Figure 14:
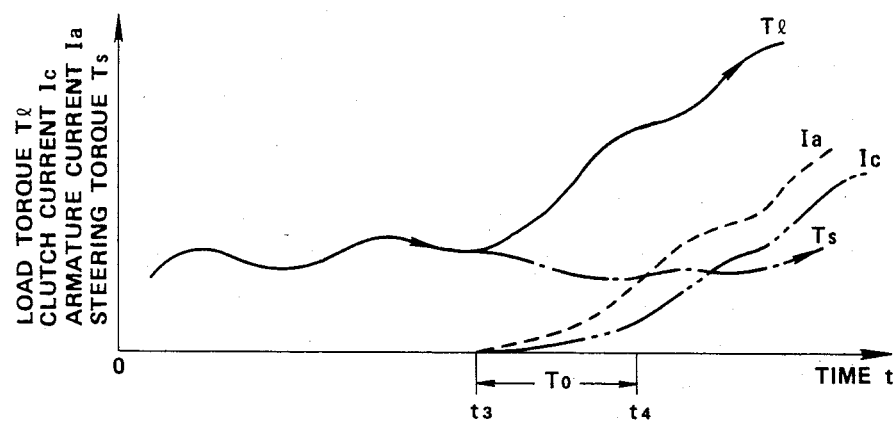

The low- or high-speed unstable region will be described below. In this unstable region, the car speed fluctuates in the vicinity of the prescribed value. For example, when the car speed changes from a low speed to a high speed, the car speed increases beyond the prescribed value, and the control signals T5, T6 start being reduced, but the car speed drops again below the prescribed value before the control signals T5, T6 are not yet completely reduced. Alternatively, when the car speed changes from a high speed to a low speed, the car speed decreases beyond the prescribed value, and the control signals T5, T6 start being increased, but the car speed increases again beyond the prescribed value before the control signals T5, T6 are not yet completely increased. The motor-driven power steering system can smoothly be controlled in the above unstable region as follows:

When the car speed increases from a low speed, i.e., A=F=G=0, beyond the prescribed value, the processing goes through the steps P22, P27, P28, P29, P30, P31, P32, P25, P26. If this loop is repeated 10 times, for example, A becomes 10, and T5−9 and T6−9 are issued. As the car speed drops below the prescribed value, the processing goes through the steps P22, P23, P36 and jumps to a step P41 in which A=A−1, i.e., A=9, is computed. Then, B=T5−9 is computed in a step P42, and T6 is set to T6−9 in a step P43. A next step P44 ascertains whether B, i.e., the control signal, is smaller than the determined value. Since B is 9 smaller than T5, the processing proceeds to a step P45 in which T5 is set to B. Thereafter, the processing jumps to the step P25 in which the control signals T5, T6 are issued. If the car speed continues to be lowered, the processing goes through the steps P22, P23, P36, P41, P42, P43, P44, P45 to increase the control signals T5, T6 with time. When the control signals T5, T6 reach the determined values, the processing jumps from the step P44 to the step P24 in which the control mode enters the low-speed stable region. Therefore, when the car speed increases beyond the prescribed value and then drops below the prescribed value before the control signals are not yet completely reduced, the reduced value A is stored, and the control signals are increased from the stored value. Conversely, when the car speed is reduced below the prescribed value and then increases beyond the prescribed value before the control signals are not yet completely increased, the increased value A is stored, and the control signals are reduced from the stored value. The armature current Ia of the motor 33 and the clutch current Ic vary with time t as shown in FIG. 13. When the car speed v increases beyond the prescribed value with the steering torque applied, the assistive torque imposed by the motor 33 is progressively reduced to zero, with the result that the steering feeling and the steering stability are improved. Designated at t1 is a time when the car speed v varies beyond the prescribed value, t2 a time when the control signals T5, T6 fall to zero, To a given time, T1 a load torque, Ts a steering torque, Ia an armature current, and Ic a clutch current. Conversely, when the car speed changes from a high speed to a low speed beyond the prescribed value, the armature current Ia and the clutch current Ic vary with time t as shown in FIG. 14. As the car speed v is reduced below the prescribed value, the assistive torque imposed by the motor 33 is progressively increased to the determined value for the given time To from a time t3, with the result that the steering feeling and the steering stability are improved.

Figure 18A:
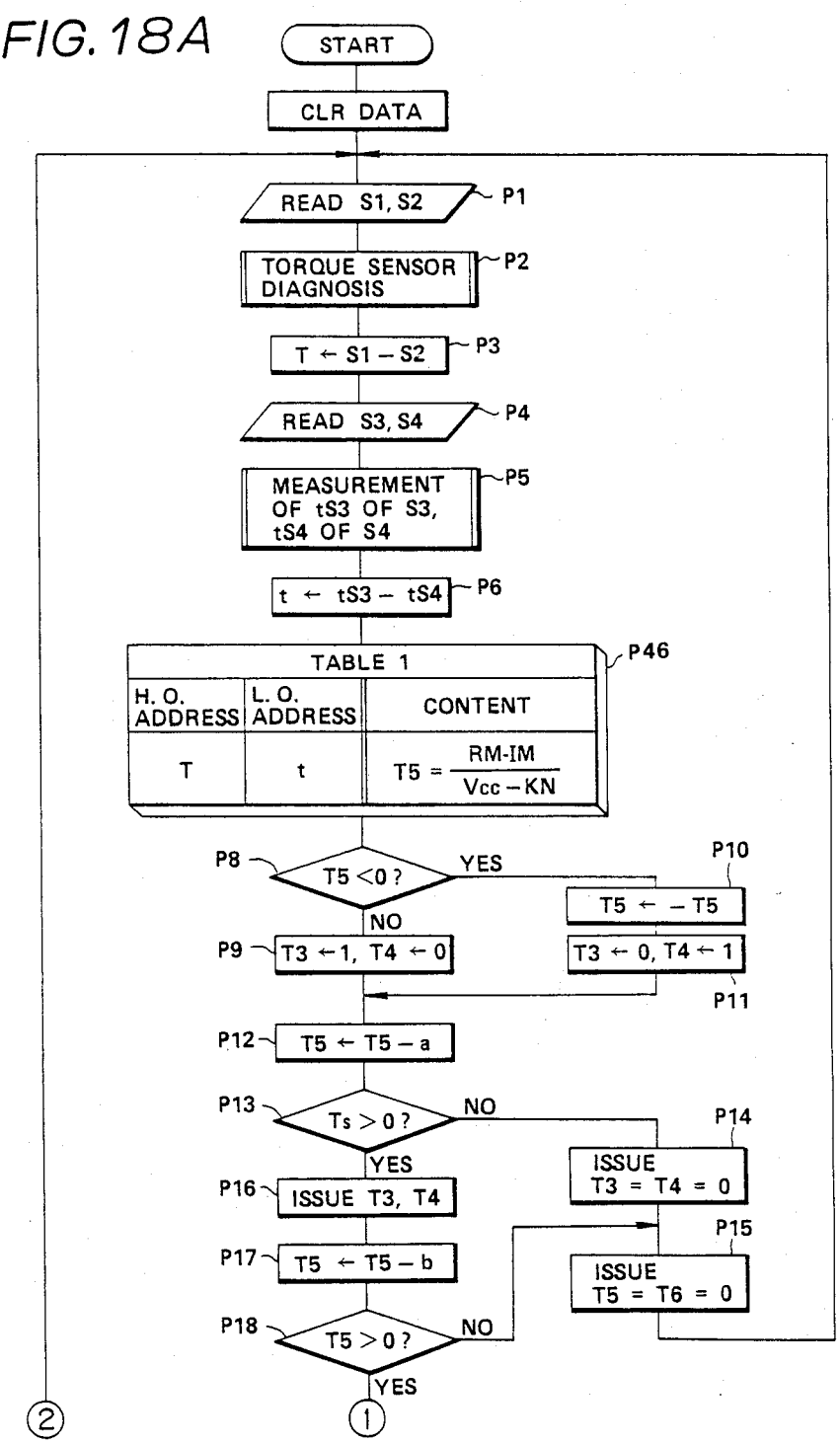
FIGS. 18A and 18B are a flowchart of a sequence of successive steps executed by a controller in a motor-driven power steering system according to another embodiment of the present invention.
Figure 18B:
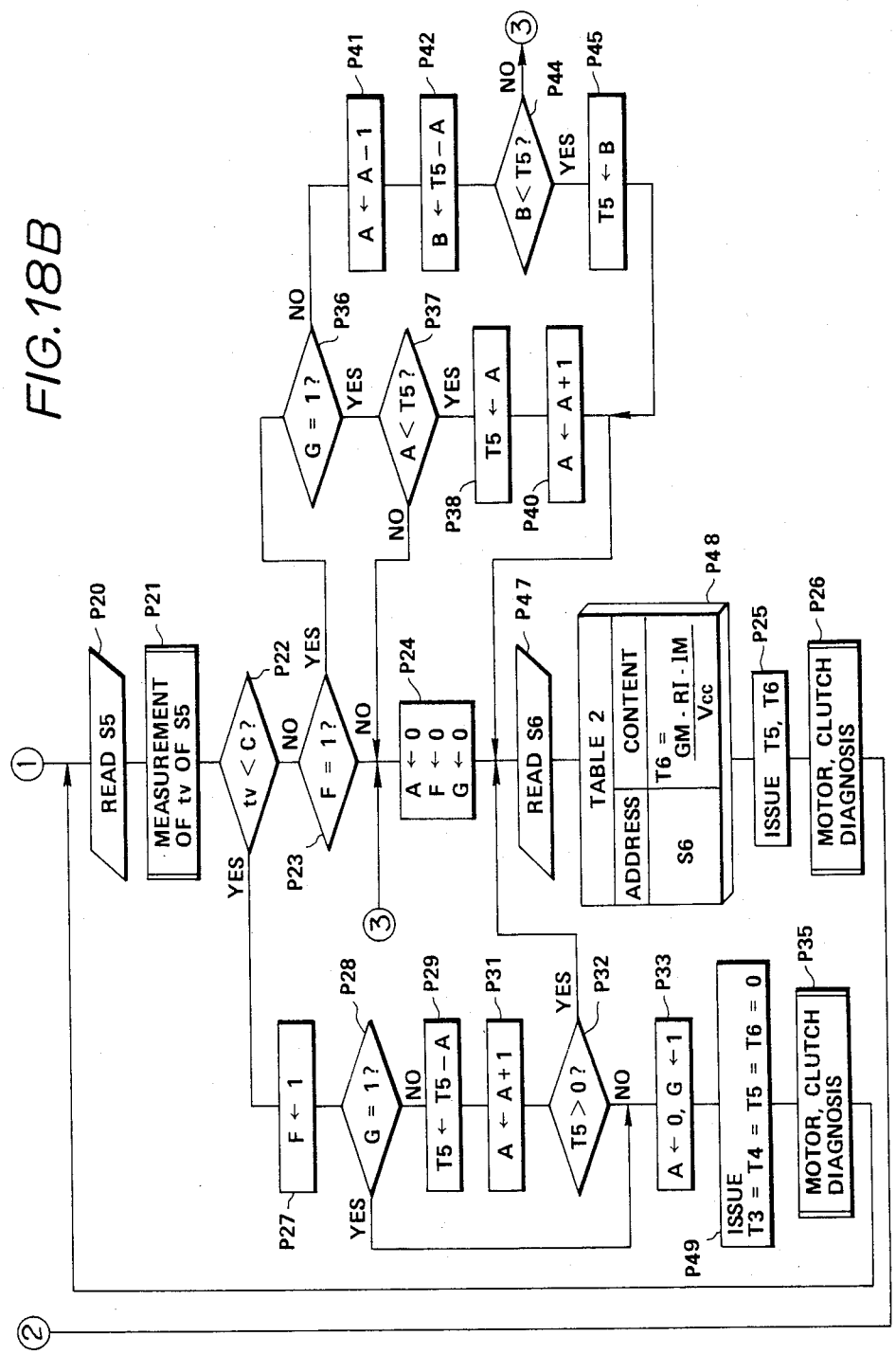

FIGS. 18A and 18B illustrate a flowchart of a control sequence according to another embodiment of the present invention. The flowchart of FIGS. 18A and 18B contains many steps identical to those of the flowchart of FIGS. 8A and 8B, and such identical steps will not be described in detail. The flowchart of FIGS. 18A and 18B does not contain the steps P7, P19, P30, P34, P39, P43 shown in FIGS. 8A and 8B, but includes additional steps P46, P47, P48, P49 which will mainly be described below.

The step P46 is inserted between the steps P6 and P8. In the step P46, a table 1 storing motor control signals T5 is established in a microcomputer memory in which the steering torque T is used as a high-order address and the period t is used as a low-order address. Since the control signal T5 is used for driving the motor driver 100 in the PWM mode, duty ratios (the ratio of a period "H" in one cycle) are stored as the control signals. The duty ratio is expressed by:

$$T5 = \text{duty ratio } (\%) = \{RM \cdot IM/(Vcc - KN)\} \times 100$$

where RM is the resistance of the multiple winding 41, K an induced voltage constant, N the rotational speed of the motor, IM the armature current, and Vcc the power supply voltage, provided that the inductance is sufficiently small. In the motor-driven power steering system, it is preferable that the armature current IM be proportional to the steering torque, and the motor speed NM be proportional to the steering speed Nx. Where the steering torque T is proportional to the armature current IM as shown in FIG. 9 and the steering speed Ns is proportional to the motor speed NM as shown in FIG. 11, the control signal T5 is given by:

$$T5 = \text{duty ratio } (\%) = k1 \cdot RM \cdot T / \{Vcc - k \cdot k2(1/t)\}$$

where k1, k2 are proportionality constants. With the values computed according to the above equation being stored in the table 1, a control signal T5 can be determined by an address designated by a steering torque T and a period t corresponding to a steering speed Ns. The microcomputer memory stores the computed duty ratios in the form of 8-bit parallel signals. The microcomputer has a circuit capable of programmably varying the duty ratios through the 8-bit parallel signals, and issuing serial-pulse signals T5 indicative of the duty ratios stored in the table 1. The control signal T5 actually issued from the microcomputer 76 and the duty ratio processed in the microcomputer 76 will be treated equivalently though they are different from each other.

Figure 12:
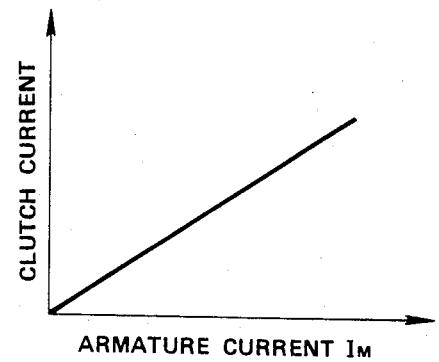
FIG. 12 is a graph showing the relationship between a clutch current and the armature current.

The steps P47, P48 are inserted between the steps P24, P25. In the step P47, the detected signal S6 corresponding to the armature current IM and produced by the malfunction detector 114 is read. In the step P48, a table 2 is established in a microcomputer memory with the detected signal S6 serving as an address, the table 2 storing values computed according to the following equation:

$$T6 = \text{duty ratio } (\%) = (Gm \cdot R1 \cdot IM/Vcc) \times 100$$

where Gm is the gain of the amplifier 115A, R1 the resistance of the resistor 106, and IM the armature current. Since the armature current IM of the motor 33 is proportional to the clutch current as shown in FIG. 12, the clutch control signal T6 is also proportional to the steering torque T. The microcomputer memory stores the computed duty ratios in the form of 8-bit parallel signals. The microcomputer has a circuit capable of programmably varying the duty ratios through the 8-bit parallel signals, and issuing serial-pulse signals T6 indicative of the duty ratios stored in the table 2. The control signal T6 actually issued from the microcomputer 76 and the duty ratio processed in the microcomputer 76 will be treated equivalently though they are different from each other. The step P48 selects, from the table 2, a control signal T6 having a pulse width proportional to an armature current corresponding to the steering torque signal.

The step P49 is inserted between the steps P33, P35 for issuing T3=T4=T5=T6=0.

Figure 15:
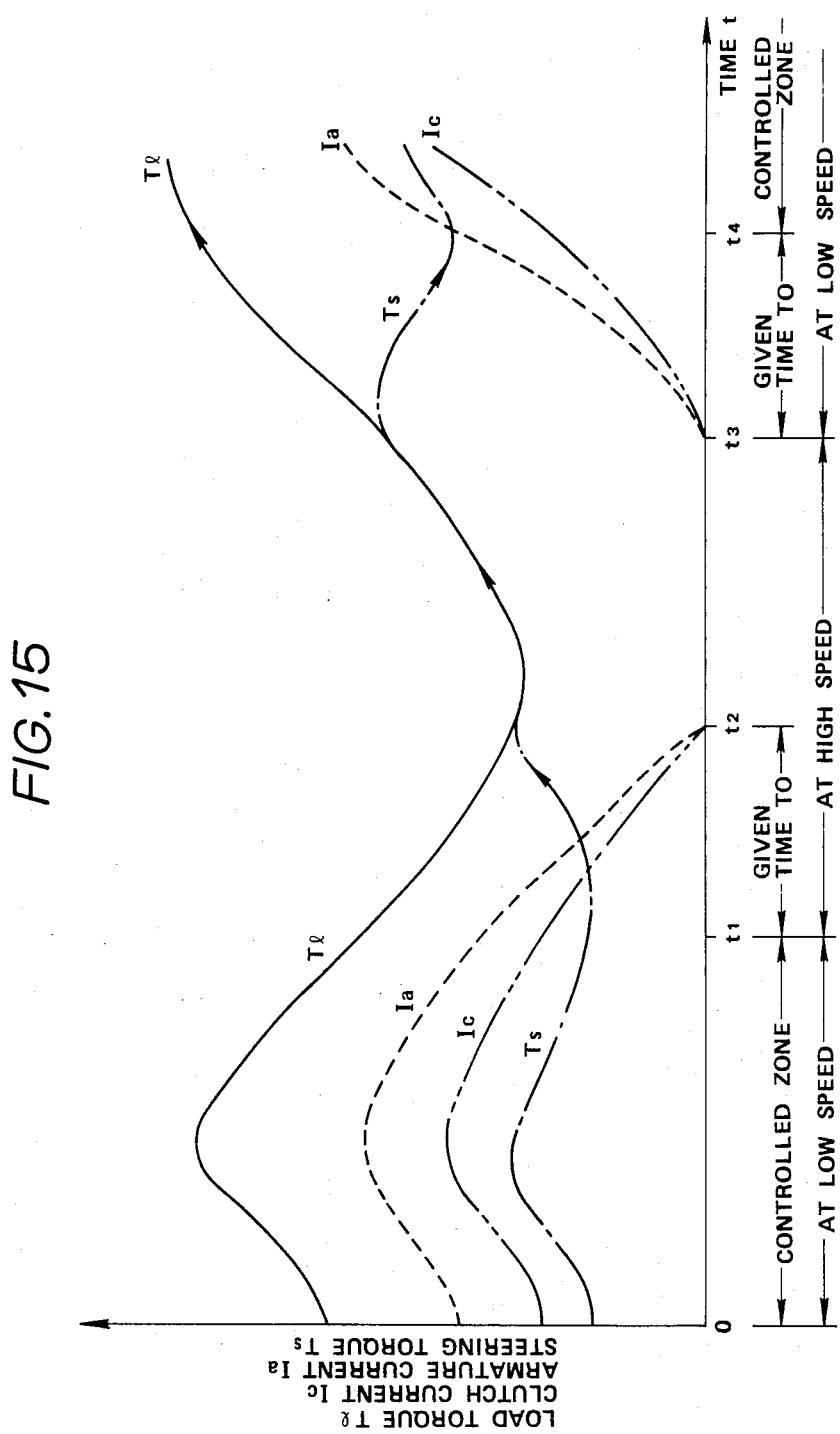
FIG. 15 is a graphshowing the manner in which the clutch current varies with time as the speed of travel of the motor vehicle is increased and reduced.

FIG. 15 shows the manner in which the armature current Ia and the clutch current Ic vary with time t in the unstable region according to the embodiment shown in FIGS. 18A and 18B.

With the arrangement of the present invention, the assistive torque produced by the motor or the torque transmitted by the electromagnetic clutch is controlled with time as the speed of travel of the motor vehicle varies, for thereby improving the steering feeling and the steering stability. The prescribed value with which the car speed is to be compared is not required to be provided with hysteresis, and the motor-driven power steering system can be operated stably when the prescribed value is reached. Furthermore, the electric power consumed by the motor-driven power steering system is reduced since the torque transmitted by the electromagnetic clutch is controlled with time.

Although there have been described what are at present considered to be the preferred embodiments of the present invention, it will be understood that the invention may be embodied in other specific forms without departing from the spirit or essential characteristics thereof. The present embodiments are therefore to be considered in all aspects as illustrative, and not restrictive. The scope of the invention is indicated by the appended claims rather than by the foregoing description.

We claim:

1. A motor-driven power steering system for use on a motor vehicle, comprising:
    steering torque detector means for detecting a steering torque applied to a steering mechanism and producing a torque signal representative of the detected steering torque;
    motor control signal generator means responsive to the torque signal from said steering torque detector means for producing a motor control signal;
    motor driven means responsive to the motor control signal from said motor control signal generator means for driving a motor to apply an assistive torque to said steering mechanism;
    speed detector means for detecting a speed of travel of the motor vehicle and producing a speed signal indicative of the detected speed;
    speed discriminator means responsive to the speed signal from said speed detector means for ascertaining whether the speed is increased or reduced beyond a prescribed value; and
    signal correcting means responsive to an output signal from said speed discriminator means for reducing the motor control signal with time from a predetermined value when the speed is increased beyond said prescribed value and for increasing the motor control signal with time up to said predetermined value when the speed is reduced below said prescribed value.

2. A motor-driven power steering system for use on a motor vehicle, comprising:
    steering torque detector means for detecting a steering torque applied to a steering mechanism and producing a torque signal representative of the detected steering torque;
    a motor for applying an assistive torque to said steering mechanism dependent on said steering torque;
    clutch means for selectively connecting said motor to said steering mechanism;
    clutch control signal generator means responsive to the torque signal from said steering torque detector means for producing a clutch control signal to determine a torque to be transmitted by said clutch means;
    clutch driver means responsive to the clutch control signal from said clutch control signal generator means for driving said clutch means;
    speed detector means for detecting a speed of travel of the motor vehicle and producing a speed signal indicative of the detected speed;
    speed discriminator means responsive to the speed signal from said speed detector means for ascertaining whether the speed is increased or reduced beyond a prescribed value; and
    signal correcting means responsive to an output signal from said speed discriminator means for reducing the torque transmitted by said clutch means with time from a predetermined value when the speed is increased beyond said prescribed value and for increasing the torque transmitted by said clutch means with time up to said predetermined value when the speed is reduced below said prescribed value.

* * * * *